US007576800B2

(12) United States Patent
Swain

(10) Patent No.: US 7,576,800 B2
(45) Date of Patent: Aug. 18, 2009

(54) EXTREME SPORTS VIDEO SYSTEM

(76) Inventor: Mike Swain, 1404 S. Tuttle Ave., Sarasota, FL (US) 34239

( * ) Notice: Subject to any disclaimer, the term of this patent is extended or adjusted under 35 U.S.C. 154(b) by 496 days.

(21) Appl. No.: 11/488,952

(22) Filed: Jul. 19, 2006

(65) Prior Publication Data

US 2006/0262194 A1 Nov. 23, 2006

Related U.S. Application Data

(63) Continuation-in-part of application No. 10/725,886, filed on Dec. 2, 2003, now abandoned.

(60) Provisional application No. 60/430,603, filed on Dec. 2, 2002.

(51) Int. Cl.
*H04N 7/18* (2006.01)
*H04N 5/232* (2006.01)
*H04N 5/225* (2006.01)

(52) U.S. Cl. ......................... 348/376; 348/81; 348/158; 348/211.2

(58) Field of Classification Search .................. 348/81, 348/82, 143, 144, 157, 158, 207.1, 211.2, 348/211.3, 211.14, 376, 373, 375
See application file for complete search history.

(56) References Cited

U.S. PATENT DOCUMENTS

| | | | | |
|---|---|---|---|---|
| 4,516,157 A | * | 5/1985 | Campbell | 348/158 |
| 5,358,110 A | * | 10/1994 | Simpson | 206/316.2 |
| 5,583,571 A | * | 12/1996 | Friedland | 348/373 |
| 5,886,739 A | * | 3/1999 | Winningstad | 348/158 |
| 6,028,627 A | * | 2/2000 | Helmsderfer | 348/374 |
| 6,181,644 B1 | * | 1/2001 | Gallagher | 367/131 |
| 6,292,213 B1 | * | 9/2001 | Jones | 348/157 |
| 6,307,526 B1 | * | 10/2001 | Mann | 348/207.1 |
| 6,563,532 B1 | * | 5/2003 | Strub et al. | 348/158 |
| 6,657,673 B2 | * | 12/2003 | Ishikawa | 348/376 |
| 6,704,044 B1 | * | 3/2004 | Foster et al. | 348/157 |
| 6,717,737 B1 | * | 4/2004 | Haglund | 348/211.99 |
| 6,819,354 B1 | * | 11/2004 | Foster et al. | 348/157 |
| 6,825,875 B1 | * | 11/2004 | Strub et al. | 348/158 |
| 6,977,671 B1 | * | 12/2005 | Kitson et al. | 348/81 |
| 7,186,159 B1 | * | 3/2007 | Baxter | 441/124 |
| 7,308,233 B2 | * | 12/2007 | Allen | 455/67.13 |
| 2004/0165109 A1 | * | 8/2004 | Lee | 348/375 |
| 2005/0200750 A1 | * | 9/2005 | Ollila | 348/375 |
| 2006/0277666 A1 | * | 12/2006 | Gertsch et al. | 2/424 |
| 2008/0192114 A1 | * | 8/2008 | Pearson et al. | 348/81 |
| 2009/0109292 A1 | * | 4/2009 | Ennis | 348/158 |

FOREIGN PATENT DOCUMENTS

JP 2005217921 A * 8/2005

* cited by examiner

*Primary Examiner*—John M Villecco
(74) *Attorney, Agent, or Firm*—Gifford, Krass, Sprinkle, Anderson & Citkowski, P.C.

(57) ABSTRACT

The present invention provides a video system for use in extreme sports videography, particularly skydiving. The video system includes a remote video head disposed on the headgear of a user in communication with a video camcorder disposed in a body pouch selectably attachable to the body of the user or an item being worn by the user. A wireless system transmits a video signal between the remote video head and the video camcorder.

8 Claims, 10 Drawing Sheets

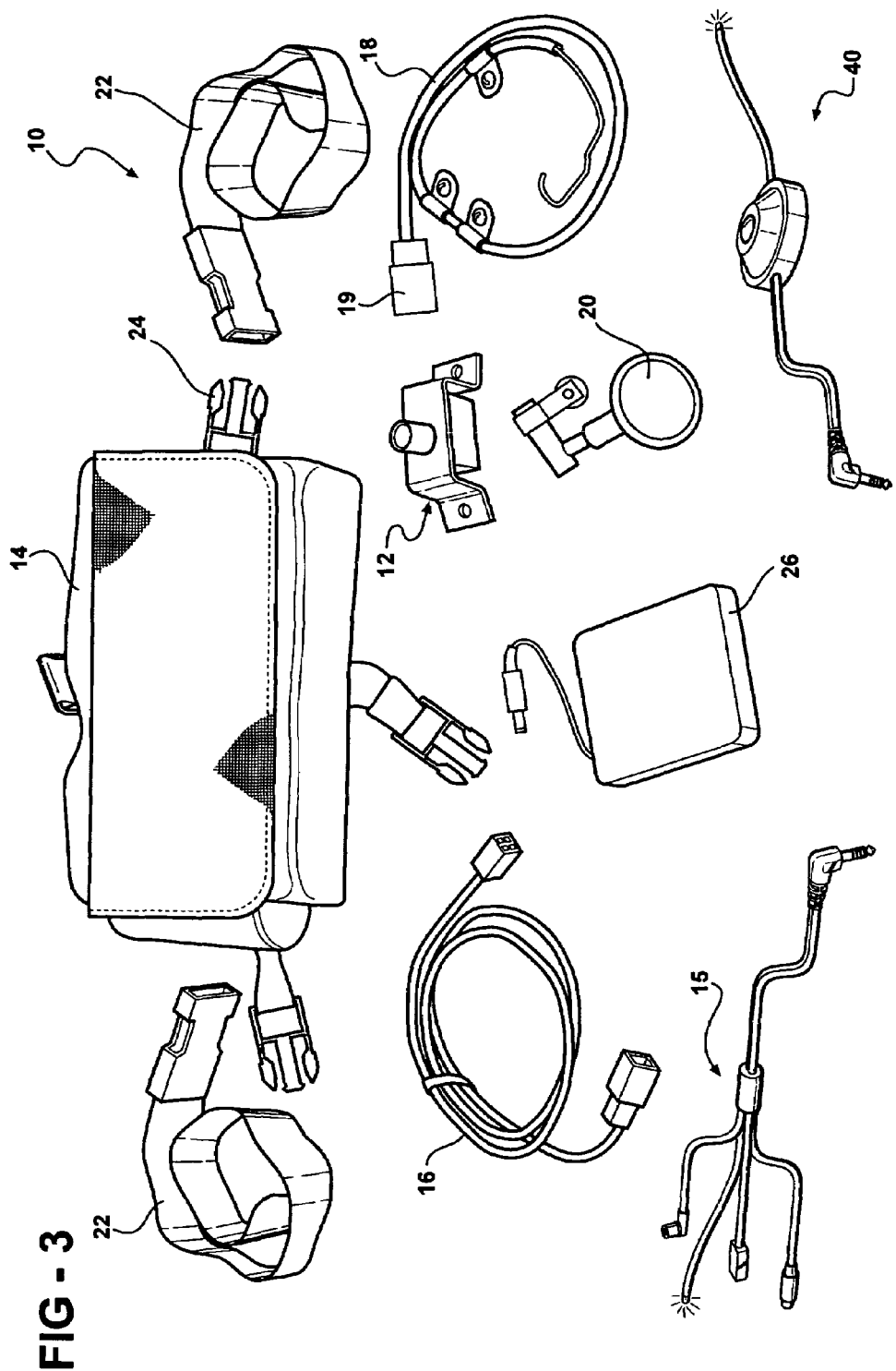

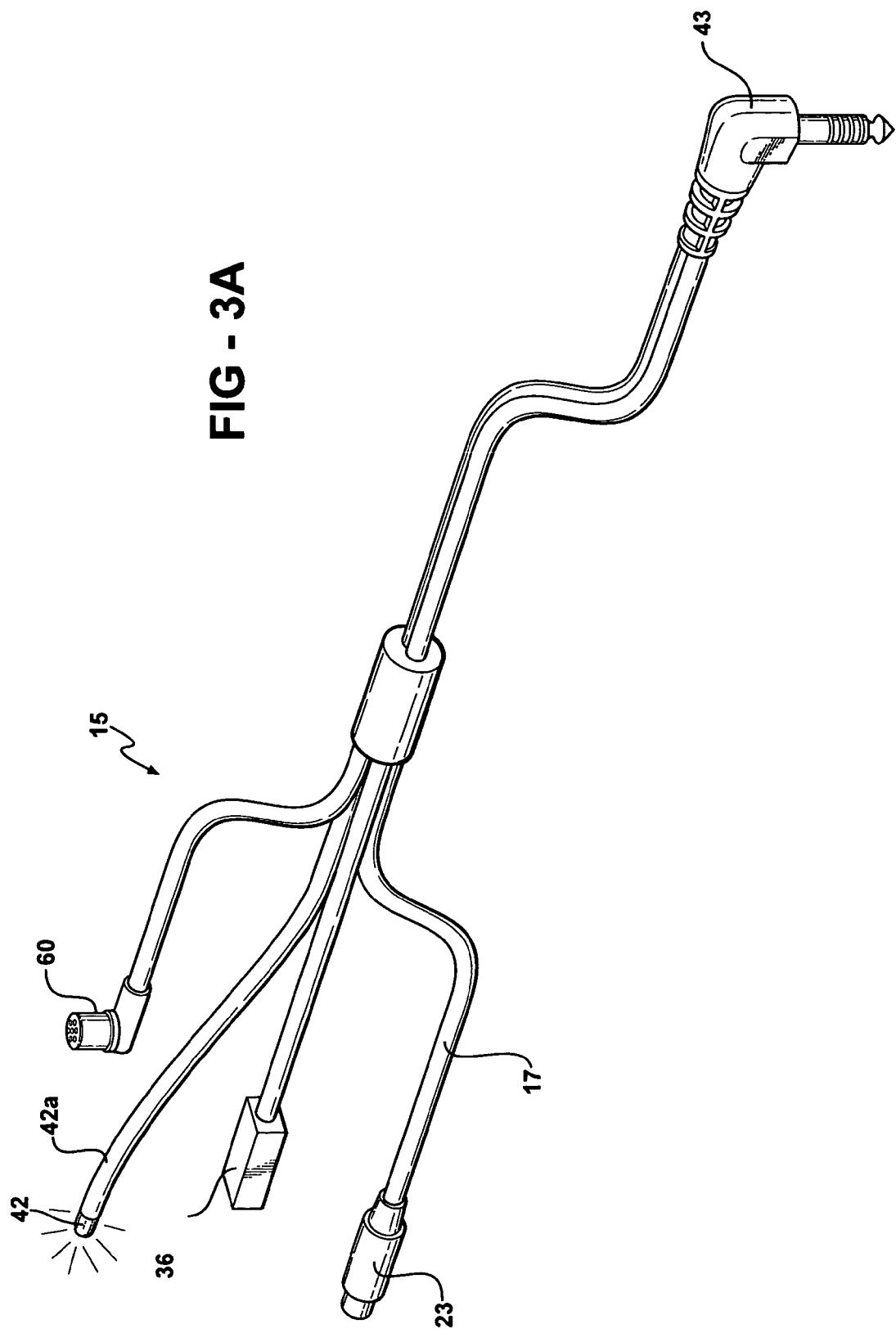

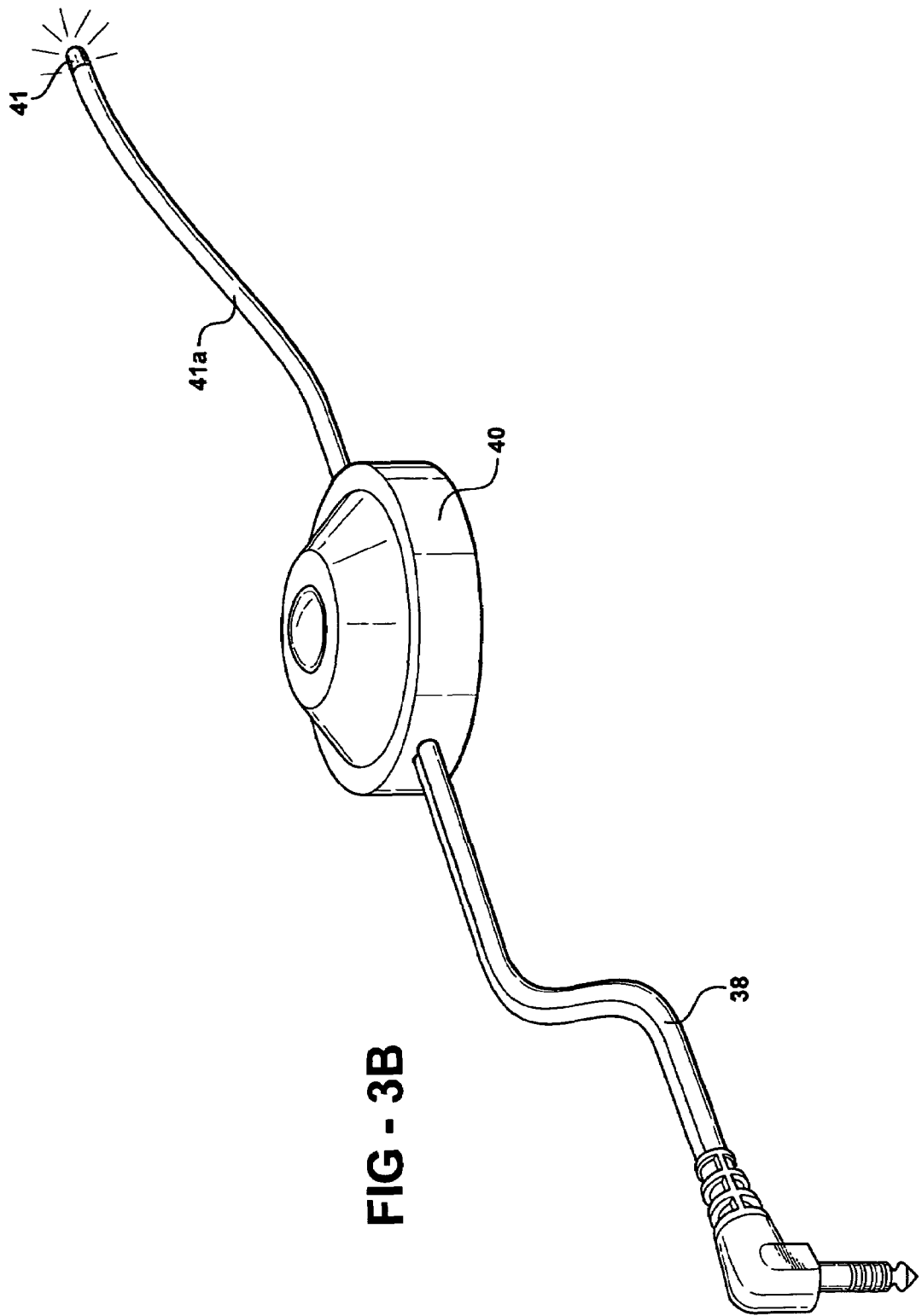

EXTREME SPORTS VIDEO SYSTEM

RELATED APPLICATION

This application is a continuation-in-part of U.S. patent application Ser. No. 10/725,886 filed on Dec. 2, 2003, the contents of which are incorporated herein by reference in its entirety.

FIELD OF THE INVENTION

The present invention relates to video equipment. More particularly, the invention relates to a video system utilizing a head-mounted remote video head operatively coupled to transfer video signals to a body-mounted recording device.

BACKGROUND OF THE INVENTION

Since the beginning of the sport of skydiving in the early 1950s parachutists have mounted cameras (C) and eye sights (E) on the top or sides of their helmets (H) for use in filming other skydivers in freefall (see FIG. 1). Positioning the camera on the helmet H is required because only the head is free to aim the camcorder C while the rest of the body, especially the arms and legs, is constantly in use to position the skydiver in freefall. However, such an arrangement of the video equipment in this manner presents several drawbacks.

One drawback is a danger of neck injury due to whiplash or strain caused by the sudden deceleration experienced during the opening of the parachute. The additional mass of the camcorder C disposed on the skydiver's helmet increases the potential for injury due to whiplash (see FIG. 2). There is also added strain on the users neck due to the aerodynamic drag associated with the flow of air past the camcorder C.

Other disadvantages to traditional methods of mounting video equipment on the helmet include potential entanglement of portions of the parachute with the camera during deployment; difficulty in using the camcorder controls or to monitor its functions while in use due to its mounted position; and the exposure of the camera to the elements which may cause damage or complete failure as a result of such exposure.

The present invention improves over conventional video equipment used in high-action sports such as skydiving and makes the use of such equipment safer, more functional, and more convenient.

SUMMARY OF THE INVENTION

According to one aspect of the invention, a video system includes a remote video head, a video camcorder, a wireless transmitter and a wireless receiver. The remote video head is adapted to be worn on a body of a user. The video camcorder is adapted to be worn on the body spaced apart from the remote video head. The wireless transmitter is coupled to the remote video head for receiving and wirelessly transmitting a video signal from the video head. The wireless receiver is coupled to the video camcorder for receiving the video signal from the wireless transmitter and providing the video signal to the video camcorder for recording.

According to another aspect of the invention, a video system includes a remote video head, a video camcorder, an external battery, and a wiring harness. The remote video head is adapted to be supported on a head of a user. The remote video head is operative to supply a video signal. The video camcorder is powered by an internal battery. The external battery supplied power to the remote video head. The wiring harness is operatively coupled to the remote video head and video camcorder for carrying the video signal from the remote video head to the video camcorder. The wiring harness has a power lead to supply power from the external battery to the remote video head.

According to another aspect of the invention, a pair of goggles is provided for use as part of a video system having a video camcorder. The goggles include a frame; a clear face plate; and a remote video head mounted to the face plate. The video head is operative to provide a video signal to the video camcorder for recording.

BRIEF DESCRIPTION OF THE DRAWINGS

A better understanding of the present invention will be had upon reference to the following detailed description when read in conjunction with the accompanying drawings in which like parts are given like reference numerals and wherein:

FIG. 3 is a perspective view of the various components of the video system according to the invention;

FIG. 3A is a perspective view of a wiring harness from the video system according to the invention;

FIG. 3B is a perspective view of a switch from the video system according to the invention;

DETAILED DESCRIPTION OF THE INVENTION

The present invention provides an improved video system for recording video during extreme sports, such as skydiving, snow skiing, base jumping and the like. The system may also be used in other extreme activities, such as in law enforcement or military surveillance. The invention provides a remote video head adapted to be worn on the body of a user and a video camcorder operatively coupled to the video head to record the footage captured by the video head. The invention facilitates operation of both the video head and the camcorder through either a wired or wireless interconnection, both of which will be described in greater detail below.

One embodiment provides goggles having an integrated video head, wherein the lens of the video head extends through an aperture in the viewing lens of the goggles. Another embodiment provides a wireless system for transmitting video signals between the video head and a video camcorder. These embodiments are described in greater detail below.

Figure 1:
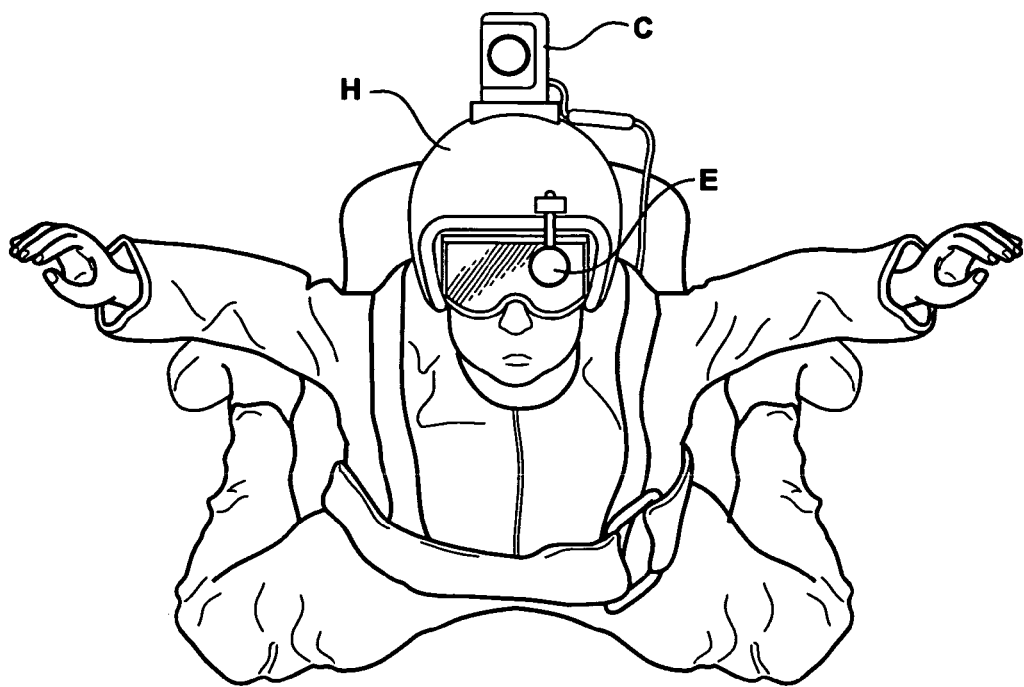
FIGS. 1 and 2 illustrate a conventional method and apparatus for videotaping an extreme sport activity.
Figure 2:
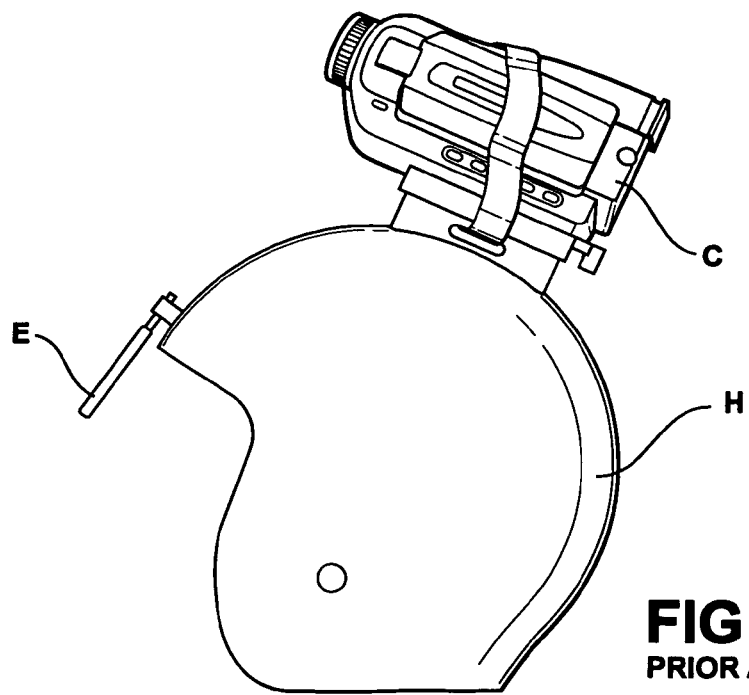

With reference to FIGS. 1 and 2, there is illustrated a conventional video system used for capturing video footage during an extreme sport activity, such as skydiving. The conventional system includes a standard video camcorder C disposed on the headgear H being worn by the user. The lens of the video camcorder C is in alignment with the user's line of sight to ensure that the lens of the camera is reliably capturing what the user is seeing. A ringsight E may be added to the system whereby the user knows that the lens of the video camcorder is capturing exactly what is seen through the ringsight E.

FIG. 2 illustrates a skydiving helmet with a video camcorder mounted on the top. Even though modern day video camcorders are much lighter than the older movie cameras of the past, it is still possible for the video camcorder to become entangled with the deployment of the chute and cause injury, such as whiplash. An alternative mounting method (not shown) includes securing the video camcorder along the side of the helmet, which presents substantially the same issues as a top mounted arrangement.

The severity of whiplash has a direct relationship to the mass of the camera that is attached to the helmet, multiplied by the distance from the base of the neck to the center of mass of the camera, multiplied by the velocity of motion. The speed of a skydiver can range between 120-200 miles per hour, depending on the body position of the diver. Thus, it is appreciated that the larger the distance between the base of the user's neck and the center of mass of the camera, plus the larger the camera, the more likely the danger of whiplash injury when the user deploys the parachute.

Figure 4:
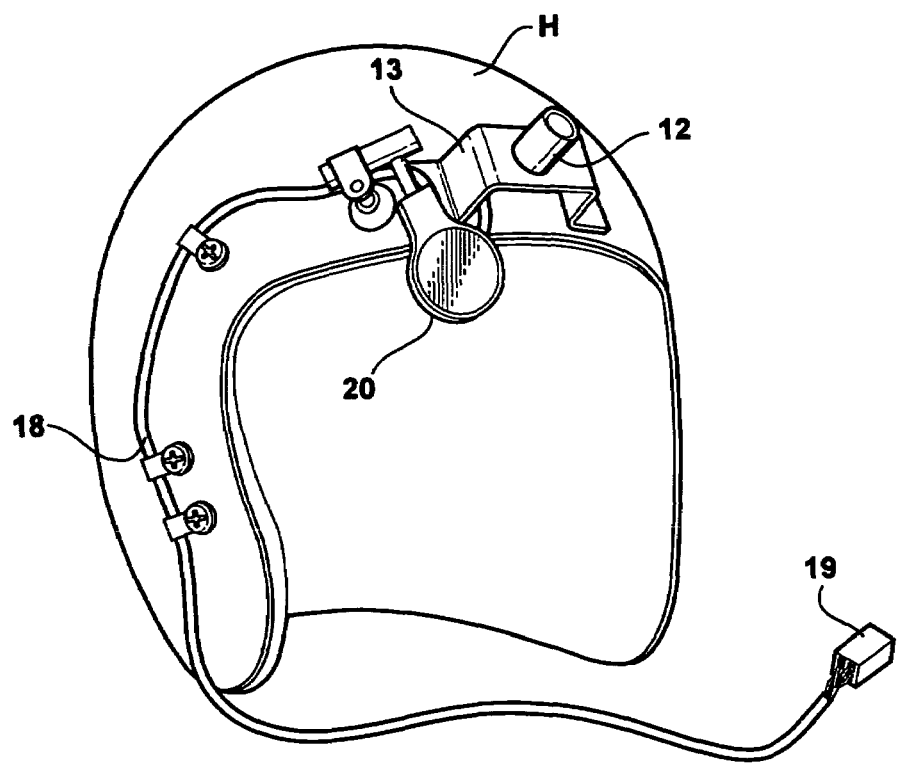
FIG. 4 is a perspective view of components of the video system disposed on a headgear according to the invention.

The invention improves over the conventional design discussed above by separating the video capture and recording functions between a compact remote video head (RVH) 12, as shown in FIGS. 3 and 4, and a video camcorder C stored in a body-mounted pouch 14, as shown in FIGS. 3, and 5-8. The RVH 12 is much smaller in size than a standard camcorder C and is mounted to the front of the helmet rather than the top or side, which overall provides the advantages of reduced mass and aerodynamic drag. The bulk of the mechanism associated with recording the captured video, i.e. the camcorder C, is now mounted to the user's body by the pouch 14. A wiring harness 15, as shown in FIG. 3, operatively couples the RVH 12 to the camcorder C and to an external battery pack 26.

It should be appreciated that the camcorder C in this embodiment is powered by its conventional built-in or on-board battery source (not shown), which is separate from the battery pack 26. As such, the battery pack 26 may be provided with its own on/off switch 29, which must be turned on and off independently from the camcorder C.

Referring now to FIG. 4, a skydiving helmet H is shown with the RVH 12 attached to a front brow portion thereof with the use of a mounting bracket 13. The RVH 12 includes no tape transport, recording or playback functions. The RVH 12 can be mounted to the user's head in a number of ways depending on the preference of the user.

An optional ringsight 20 is also mounted to the helmet H in proximity to the RVH 12. The ringsight 20 provides an optical bulls-eye, which allows the user to aim the lens of the RVH 12 in a desired direction while recording. When the user has the subject lined up in the middle of the ringsight 20, the RVH 12 will be aligned to properly capture the action. However, the ringsight may not be necessary when the RVH 12 utilizes an extreme wide angle lens, where selective framing of the action is not necessary.

A four-wire electrical cable 18 is extends from the RVH 12. The cable 18 is routed along and secured to an outer surface of the helmet with fasteners. The electrical cable 18 terminates at a four-pin connector 19, which hangs about twelve inches below the lower edge of the helmet H. The cable 18 provides a conduit for transmitting power to and video signals from the RVH 12. As shown in FIG. 3, an RVH extension cable 16 is coupled to the RVH 12 via the connector 19. More specifically, the extension cable 16 includes four wires corresponding to the four wires in the cable 18 and harness 15. The extension cable 16 has opposite ends having four-pin connectors for coupling to the cable 18 and the wiring harness 15. Two of the four wires carry the battery power from the battery pack 26 in the body pouch 14 to the RVH 12, while the other two wires carry the video signal between the RVH 12 and the camcorder C in the body pouch 14.

The extended length of the extension cable 16 is longer than necessary to provide several advantages: 1) it provides greater freedom of movement for the user; 2) it facilitates connection to the helmet H or goggles G prior to placement on the head of the user; and 3) it facilitates checking the camcorder C functions before use.

Referring to FIGS. 3 and 3A, the wiring harness 15 includes the complementary connector 36 at one end and a male plug 43 an opposite end. The male plug 43 is adapted to plug into an audio/video ("A/V") jack or port of the camcorder C. Audio signals are collected by a microphone 60. In one embodiment, the microphone 60 is a mini "line level" type having its own built-in amplifier and is powered by the battery pack 26. The microphone 60 is operative to provide an audio signal to the camcorder C via the wiring harness 15 while the camcorder C in its VTR (or VCR) recording mode. At the same time, the video signal from the RVH 12 is transmitted to the camcorder C via the cable 18, the extension cable 16, and the wiring harness 15. The plug 43 is operative to transmit both the audio and video signals from the wiring harness 15 to the camcorder C. The wiring harness 15 includes a power lead 17 electrically coupled to the connector 36 to supply power to the RVH 12 via the connection between the electrical cable 18, the extension cable 16, and the wiring harness 15.

Figure 6:
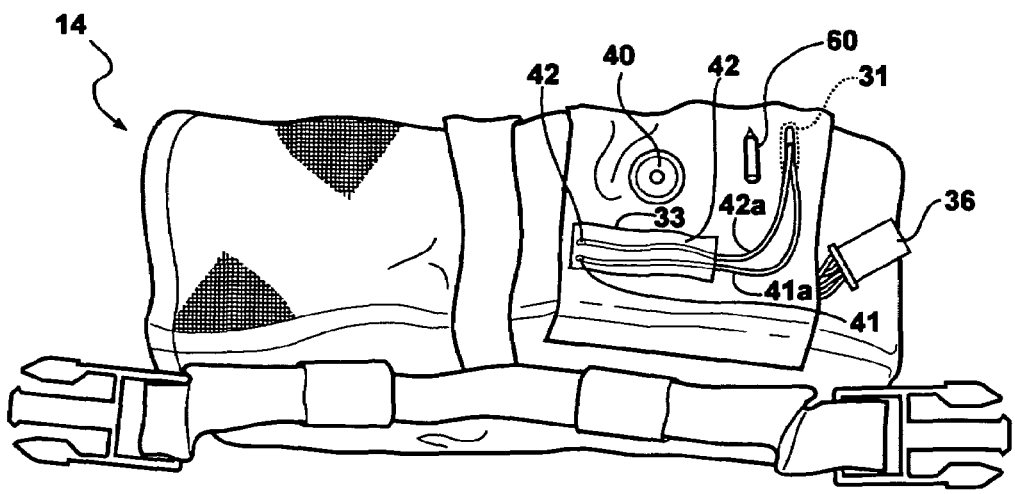
FIG. 6 illustrates a rear top view of the camera body pouch.

An LED indicator light 42 is coupled to the wiring harness 15 to provide a visible light signal indicating the status of power being supplied to the RVH 12. The indicator light 42 is provided on the distal end of a wire lead 42a electrically coupled to the wiring harness 15. The wire lead 42a provides sufficient length to allow the indicator light 42 to be routed to an area outside of the pouch 14, as shown in FIG. 6.

Referring to FIGS. 4-8, the wiring harness 15 is secured to the inside of a closeable flap 30 of the pouch 14 and the complementary connector 36 remains accessible when the flap 30 is closed for connection with the connector 19 of the electrical cable 18 via the RVH extension cable 16. The camcorder C is stowed in a main compartment of the pouch 14 and secured therein by the closeable flap 30. The wire lead 42a passes through a slot 31 in the flap 30 and extends into a pocket defined by a plastic panel 33 sewn along an outer surface of the flap 30. The plastic panel 33 is clear so that the indicator light 42 is visible therethrough.

Figure 7:
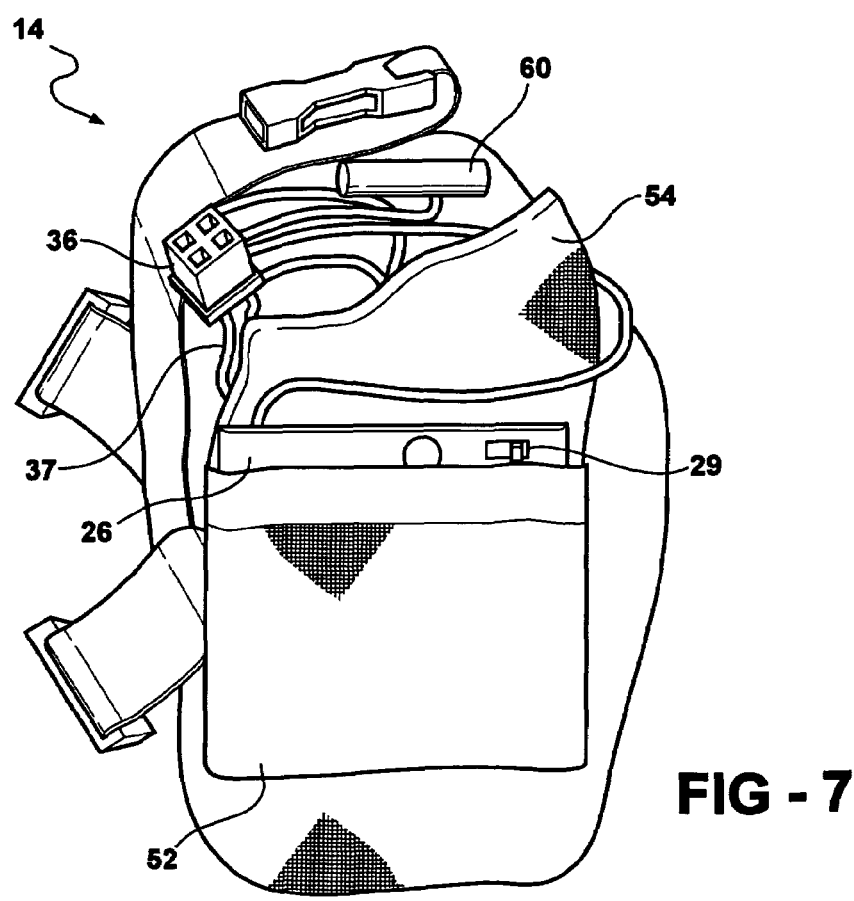
FIG. 7 illustrates a side view of the camera body pouch wherein the battery compartment for the remote video head is disposed.
Figure 8:
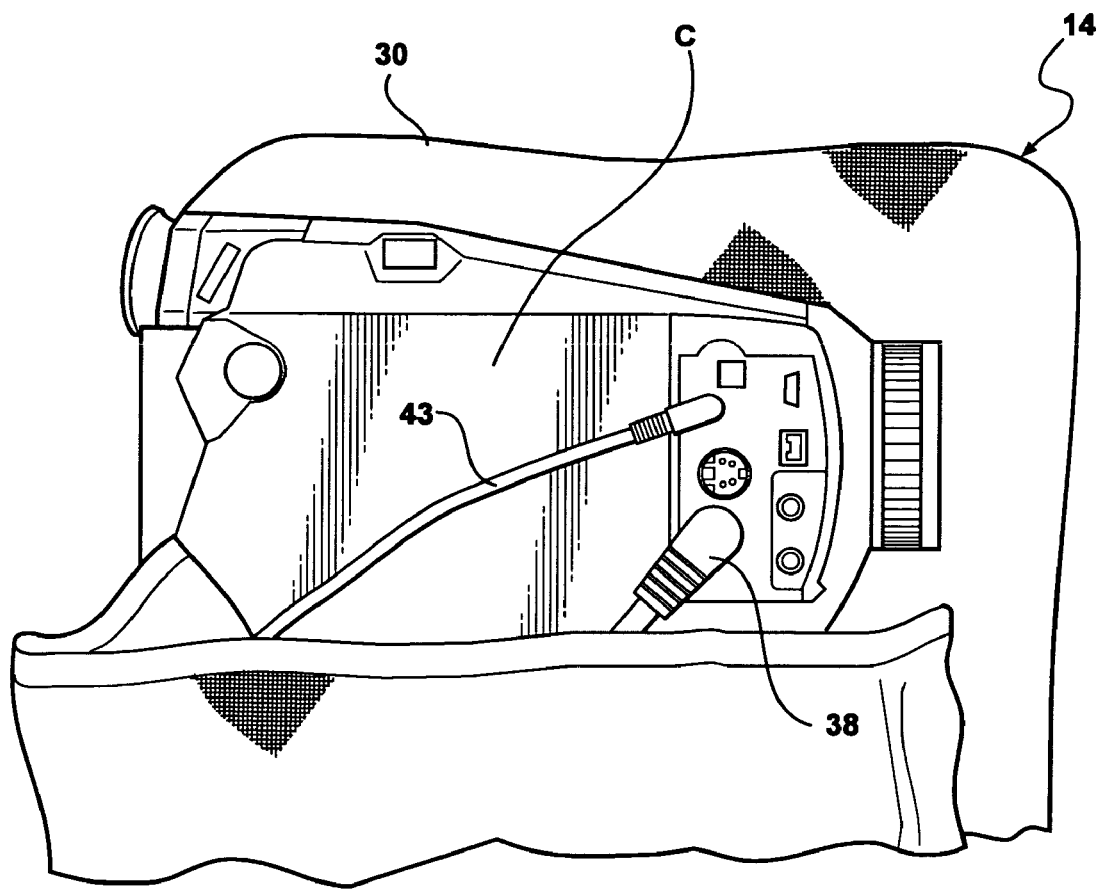
FIG. 8 illustrates a camcorder being inserted into a main compartment of the camera body pouch.

Referring to FIG. 7, the battery 26 is stowed in an external pocket 52 of the pouch 14 providing easy access to the battery's on/off switch 29. The battery 26 is coupled to the power lead 17 via a standard male/female jack or interface 23 (FIG. 3A). The use of a standard interface facilitates removal of the battery pack 26 from the pocket 52 for charging or replacement with another battery pack. Illustratively the battery pack 26 may utilize readily available AAA batteries cells, which in turn may be alkaline, lithium ion, or rechargeable NiCD or NiMH.

The camcorder C disposed in the camera body pouch 14 acts as the videotape transport and recording device. While coupled to the RVH 12 as part of the video system 10, the camcorder C is operated in videotape recorder (VTR) or video cassette recorder (VCR) mode. Any conventional camcorder C having a "LANC" remote operation mode may be used as part of the video system 10. Illustratively, camcorders manufactured by Sony utilize the LANC facility and are readily usable with the video system 10 according to the invention.

Figure 5:
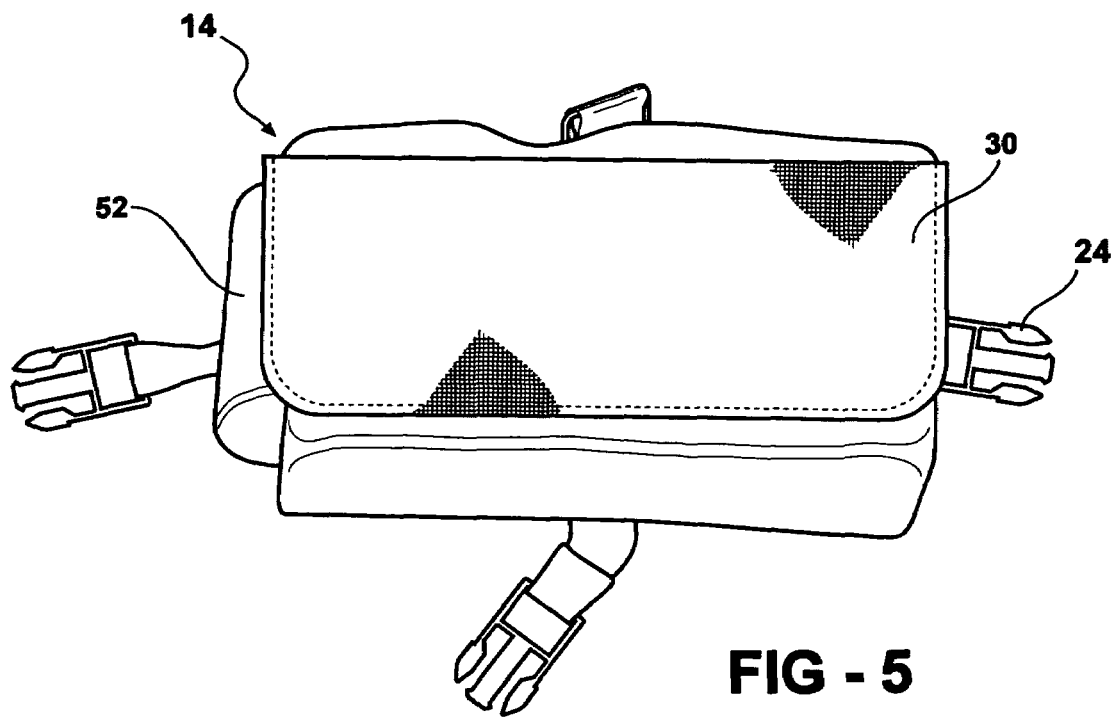
FIG. 5 illustrates a front view of the camera body pouch.

The camera body pouch 14 may be formed of a high strength, durable, natural or synthetic fabric or animal skin. In one embodiment of the invention, the pouch 14 is made of nylon and duck cloth with padding to protect the camcorder C, harness 15 and battery 26 from jarring and environmental elements, such as moisture and dust. As shown in FIG. 5, the camera body pouch 14 includes tie-down straps having quick connect fasteners 24 disposed at the terminal ends which mate with complementary fasteners at the ends of tie-down straps disposed on the user. Preferably, the tie-down straps are adjustable so the body pouch 14 can be secured snugly to the body of the user after connection.

The top flap 30 includes a conventional fastener for closing the flap 30 over the camcorder C once disposed within the main compartment of the pouch 14. Illustratively, the fastener may be provided in the form of Velcro, snap fasteners, zippers or quick connect fasteners 24 as described above. For skydiving applications, the pouch 14 is designed to be attached to a harness and positioned in the lower abdominal area.

As shown in FIG. 3B, a pushbutton switch 40 is provided for remotely switching the camcorder C on and off while in the pouch 14. A first wire 38 extends from the switch 40. The wire 38 includes a jack connector for coupling to the LANC port of the camcorder C, which then enables the user to operate the camcorder C remotely by pressing the switch 40.

A second wire 41a extends from the switch 40. A switch LED 41 is provided at the distal end of the second wire 41a. The switch LED 41 indicates whether the camcorder C is in standby mode, record mode, or off as well as many other camera functions. The second wire 41a provides sufficient length to allow the indicator light 41 to be routed to an area outside of the pouch 14, as shown in FIG. 6.

The switch LED 41 may provide multiple colors to indicate multiple operating modes of the camcorder C. Illustratively, the switch LED 41 may emit a blue light for standby mode, a red light for record mode or a combination of blue and red to indicate "power down" of the camcorder C. The LED 42 for the RVH 12 is provided in a different color from the switch LED 41, such as green, to allow one to easily distinguish between the operation of the RVH 12 and the camcorder C. As best shown in FIG. 6, the LED's 41, 42 are positioned along an outer surface of the pouch 14 and secured behind the clear plastic sleeve 33.

The A/V cable with plug 43 and the LANC cable with plug 38 are located on the inside of pouch 14 and connected to the respective jacks on the camcorder C body. The camcorder monitor door is opened, turned around 180 degrees and closed back against the body of the camcorder. The camcorder is then placed in the pouch 14, the top flap 30 closed, and the security strap snapped shut. The control button 40 on top of the pouch is pressed once to power up the system. The switch LED 41 emits a blue light showing the camcorder C is powered up and in the standby mode. The indicator LED 42 has also been activated automatically and turns green to indicate that the RVH 12 is powered. A window flap (not shown) on the front of the pouch can be pulled open to see there is a picture on the camcorder monitor to confirm overall operation of the system prior to the jump. The picture on the camcorder monitor can be seen through a clear plastic window 94 provided on the front of the pouch. Alternatively, a reflection of the picture may be viewed on a small acrylic mirror (not shown) sewn into the window flap.

After confirming operation, the system 10 may be powered down to preserve battery power as the plane ascends to a desired jumping altitude. The switch 40 is pressed continuously until the camcorder C powers down. The switch LED 41, viewable through the clear window of the pouch 14, emits a blinking blue and red light. When the multi-function switch 40 is released, the switch LED 41 turns off indicating the camcorder C is powered down and the green light emitted from the LED 42 turns off indicating the RVH battery pack 26 is powered off.

When the aircraft has reached jump altitude, the camcorder C is turned on by pressing the switch 40. The switch LED 41 glows blue to indicate the camcorder is on and on standby. The helmet H or goggle G is placed and secured to the user's head. Just prior to exiting the aircraft, the user may press the switch 40 again to switch the camcorder C to recording mode. The blue light changes to red indicating that the camera is recording. The camcorder C may remain on at any time during the descent to the ground under parachute. The location of the switch 40 along the outer surface of the pouch 14 facilitates selective switching of the camcorder C between record and standby at any time during the descent to the ground under parachute.

Figure 9:
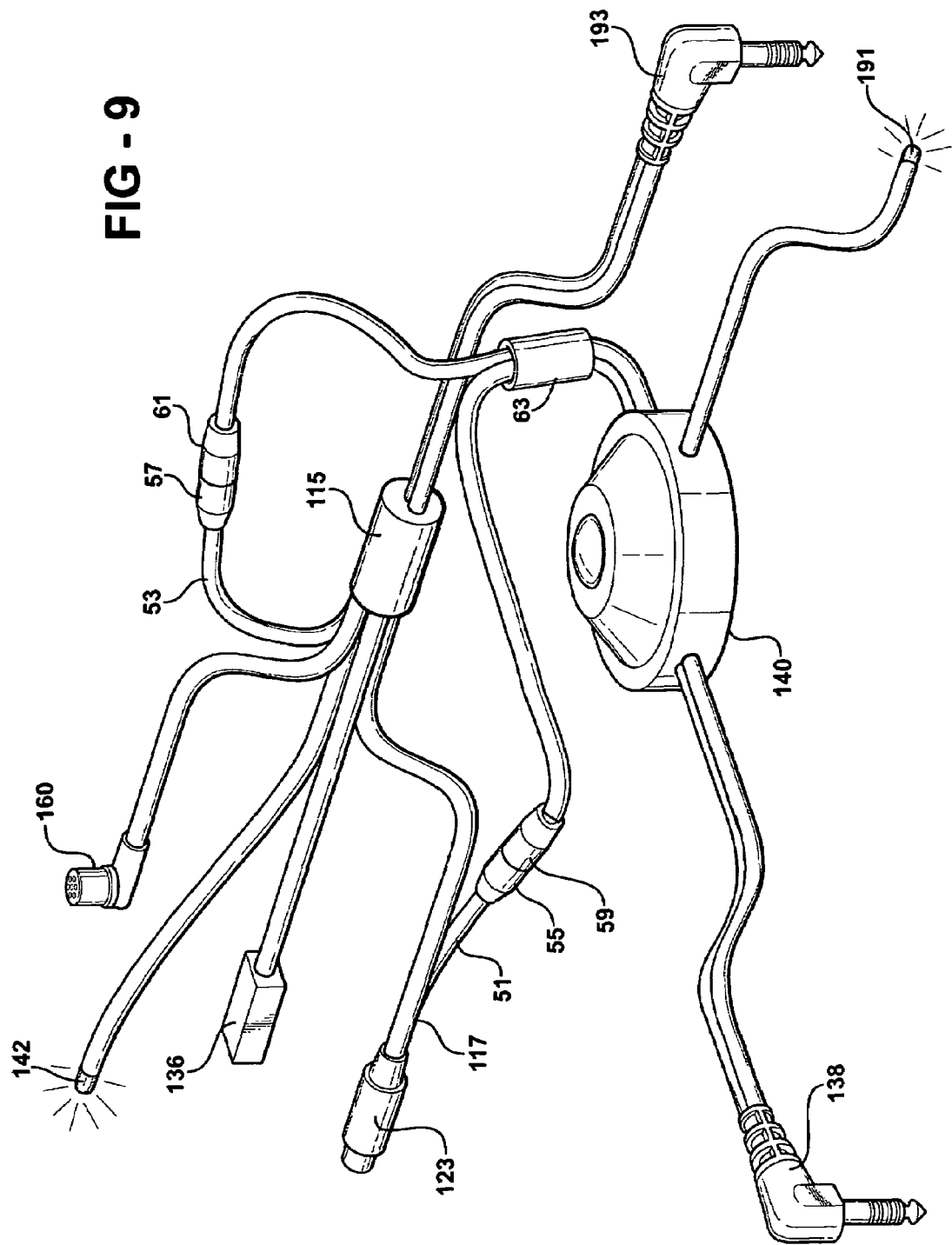
FIG. 9 is a perspective view of the wiring harness and switch assembled together in accordance with a second embodiment of the invention.

Referring to FIG. 9, a harness and switch for use in a second embodiment are generally indicated at 115 and 140, respectively, wherein like components and features from the previous embodiment are indicated by numerals offset by 100. In this embodiment, the power lead 117 is split into two wire sections. One of the wire sections 51 extends from the interface 123, while the other of the wire section 53 extends from the main body of the harness 115. The switch 140 includes a relay 63 and a pair of power wires 59, 61 extending therefrom. The switch 140 is coupled to the harness 115 by connecting the power wires 59, 61 to connectors 55, 57 disposed at the ends of the wire sections 51, 53 from the harness 115. Using the relay 63 in this arrangement allows the power switch 140 to control the operation of the camcorder C, the RVH 12 and the battery pack 26, thereby eliminating the need for a separate on/off switch 29 on the battery pack 26 as in the previous embodiment.

Figure 10:
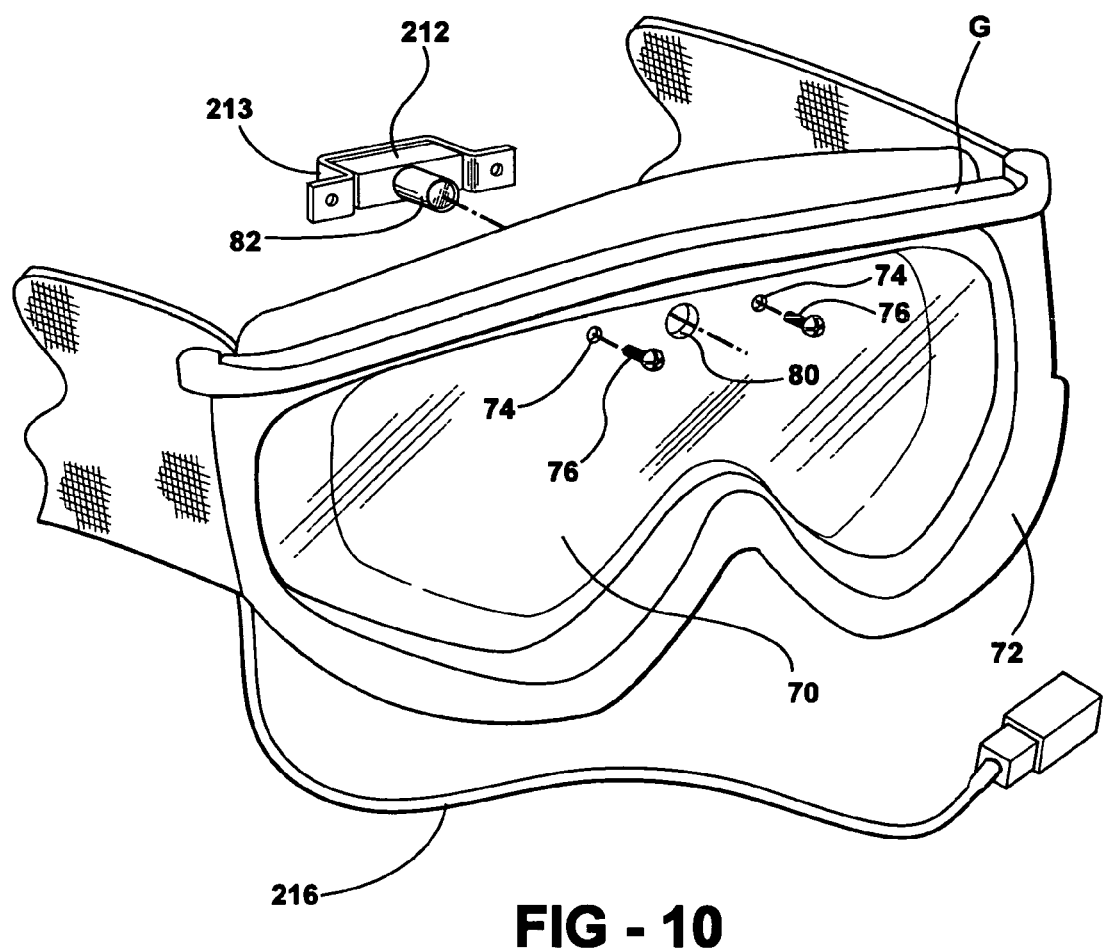
FIG. 10 is a perspective view of a pair of goggles as used as part of the video system according to a third embodiment of the invention.

Referring to FIG. 10, a third embodiment of the video system is illustrated, wherein the video head 212 is fixedly secured to a set of goggles G instead of the helmet H in the previous embodiment. More specifically, the goggles G includes a clear, protective face plate 70 supported in an endless frame 72. The face plate 70 includes a pair of mounting holes 74 for securing the video head 212 to the face plate 70 using the mounting bracket 213 and screws 76. The main body of the video head 212 is disposed along an inside surface of the face plate 70. The face plate 70 includes a center bore 80 disposed between the mounting holes 74 for receiving the lens 82 of the video head 212 therethrough. The cable 216 delivers the video signal provided by the video head 212 to the camcorder C. It should be readily appreciated by those skilled in the art that the video head 212 can be coupled to other goggle styles using any suitable fastening methods other than as shown in the figures.

Figure 11:
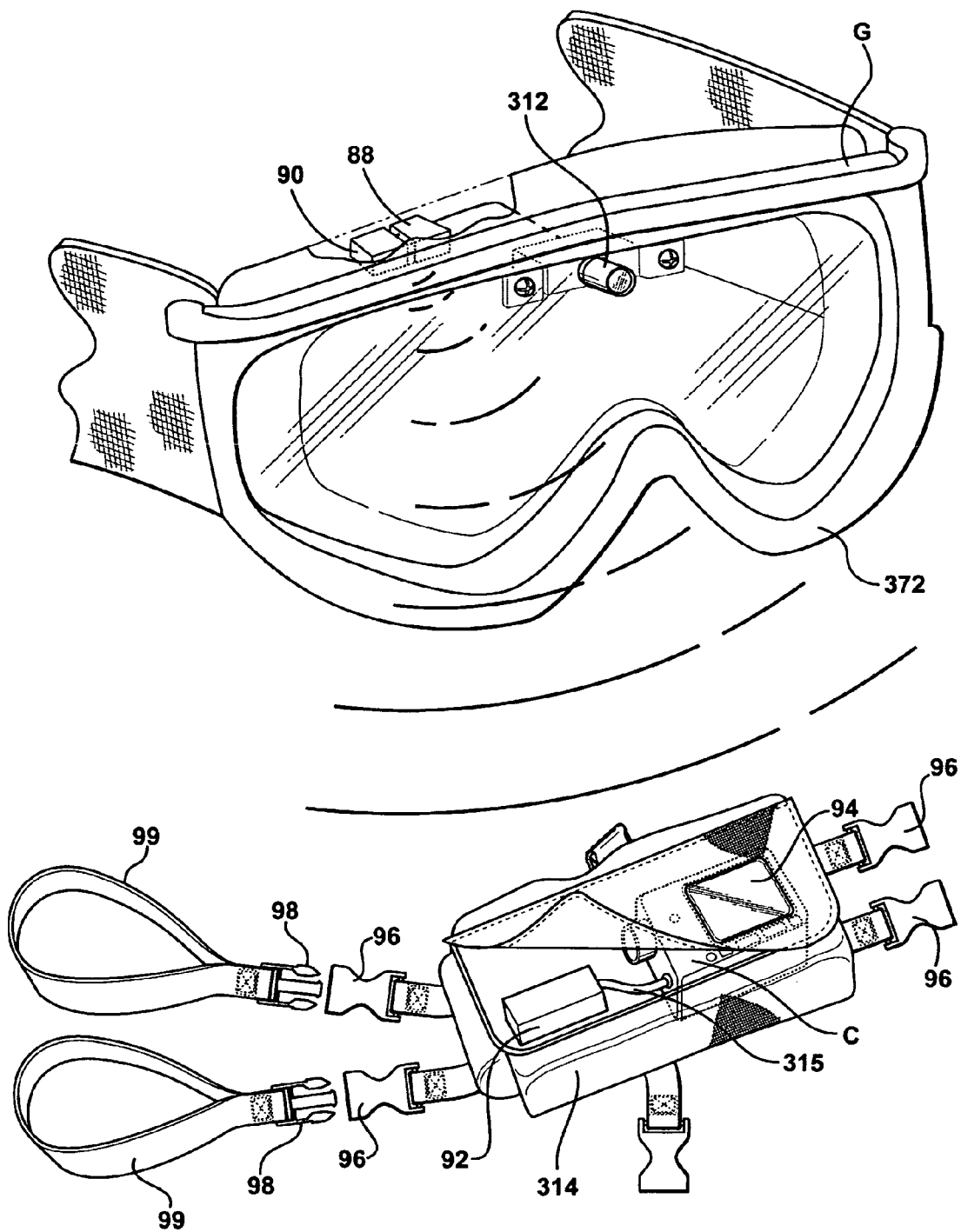
FIG. 11 is a perspective view of the video system according to a fourth embodiment of the invention.

In FIG. 11, a fourth embodiment of the video system is shown, which includes a wireless system for transmitting video signals between the RVH 312 and the camcorder C. The wireless system includes a transmitter 90 coupled to the RVH 312. The transmitter 90 receives the video signal provided by the RVH 312 and transmits a wireless signal. The transmitter 90 is supported along an inside surface of the frame 372 of the goggles G or incorporated inside the housing of the video head 212. The RVH 312 and transmitter 90 are powered by a battery 88. The battery 88 may be affixed to a goggle strap or the goggle frame 72. Alternatively, the battery may be disposed in a single housing with the transmitter and/or RVH. The wireless system also includes a receiver 92 coupled to the camcorder C by the wire harness 315 for receiving the video signal from the transmitter 90 and providing the signal to the camcorder C for recording. The wiring harness 315 is shown illustratively in FIG. 11 as a single wire, though it should be readily appreciated that the wire harness 315 is constructed similarly to the wiring harness 115 of FIG. 9, as previously described. Thus, the receiver 92, instead of the RVH, is coupled to the wiring harness 315 via the connector (136 in FIG. 9). By this arrangement, the relay (63 in FIG. 9) is operatively coupled between the switch (140 in FIG. 9), receiver 92 and the external battery to allow simultaneous remote operation of both the camcorder C and the receiver 92 via actuation of the switch (140).

The receiver 92 is disposed within the pouch 314 along with the camcorder C. It should be appreciated that the signal can be any suitable band or radio standard providing the best transmission performance for the conditions in which the system is used. It should also be appreciated by those skilled in the art that the wireless system can also be incorporated in the helmet mounted embodiment described above for transmitting video signals between the video head and camera. Optionally, the transmitter and receiver are multi-channel capable so as to allow the user to select the best channel for transmitting the video signal between the remote video head and camcorder, particularly when other channels are in use nearby.

The pouch 314 may also include a window 94 allowing viewing of the camera monitor. The window 94 may be formed from clear plastic and sewn along edges of an opening formed in the pouch 314. The pouch 314 also includes a pair of quick connect fasteners 96 secured to each end of the pouch 314. The fasteners 96 are mateable with complementary fasteners 98 at the ends of tie down straps 99 allowing the pouch 314 to be secured to the user's body. It should be readily appreciated by those skilled in the art that the pouch 314 having the window 94 may be incorporated in the previously described embodiments of the video system.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A video system comprising:
a remote video head adapted to be worn on a body of a user;
a video camcorder adapted to be worn on the body spaced apart from the remote video head;
a wireless transmitter coupled to the remote video head for receiving and wirelessly transmitting a video signal from the video head;
a wireless receiver coupled to the video camcorder for receiving the video signal from the wireless transmitter and providing the video signal to the video camcorder for recording;
a wiring harness coupling the wireless receiver and the video camcorder, the wiring harness having a switch for operation of the wireless receiver and the video camcorder; and
a relay operatively coupled between the switch and the wireless receiver to allow simultaneous remote operation of both the video camcorder and the wireless receiver via actuation of the switch.

2. A video system as set forth in claim 1, wherein the remote video head is mounted to headgear worn by the user.

3. A video system as set forth in claim 2, wherein the headgear is a set of eyewear having a clear protective face plate.

4. A video system as set forth in claim 3, wherein the remote video head is disposed along an inner surface of the face plate, the face plate including a hole receiving a lens from the remote video head therethrough.

5. A video system as set forth in claim 3, including a bracket for fixedly securing the remote video head along the inner surface of the face plate.

6. A video system as set forth in claim 5, wherein the face plate includes a hole that receives a screw therethrough for fixedly securing the bracket to the face plate.

7. A video system as set forth in claim 1, including a pouch for carrying the video camcorder and wireless receiver on the body of the user, the pouch having a window for viewing the video camcorder therethrough.

8. A video system as set forth in claim 1, wherein the wireless transmitter and wireless receiver are operable to transmit the video signal on a plurality of channels.

* * * * *

UNITED STATES PATENT AND TRADEMARK OFFICE
CERTIFICATE OF CORRECTION

PATENT NO.      : 7,576,800 B2                                          Page 1 of 1
APPLICATION NO. : 11/488952
DATED           : August 18, 2009
INVENTOR(S)     : Mike Swain It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Seventh Day of September, 2010

David J. Kappos
*Director of the United States Patent and Trademark Office*